United States Patent [19]

Boticki

[11] Patent Number: 4,946,204
[45] Date of Patent: Aug. 7, 1990

[54] SNAP SWIVEL COUPLING FOR FLUID FLOW APPLICATIONS

[75] Inventor: John A. Boticki, Racine, Wis.

[73] Assignee: Fred Knapp Engraving Co., Inc., Racine, Wis.

[21] Appl. No.: 318,626

[22] Filed: Mar. 3, 1989

[51] Int. Cl.[5] ............................................. F16L 27/08
[52] U.S. Cl. ..................................... 285/281; 285/423; 285/921
[58] Field of Search ......... 285/921, 423, 272, 281–331

[56] References Cited

U.S. PATENT DOCUMENTS

| | | | |
|---|---|---|---|
| 3,167,330 | 1/1965 | Draudt | 285/903 |
| 4,067,534 | 1/1978 | Frey | 285/423 X |
| 4,152,017 | 5/1979 | Abramson | 285/423 X |
| 4,214,586 | 7/1980 | Mericle | 265/921 X |
| 4,474,392 | 10/1984 | Vassallo et al. | 285/921 X |
| 4,558,889 | 12/1985 | Gans | 285/903 |
| 4,625,998 | 12/1986 | Draudt et al. | 285/423 X |
| 4,679,827 | 7/1987 | Law | 285/331 X |

FOREIGN PATENT DOCUMENTS 2181806 4/1987 United Kingdom ................ 285/281

*Primary Examiner*—Dave W. Arola
*Attorney, Agent, or Firm*—Andrus, Sceales, Starke & Sawall

[57] ABSTRACT

A 90 degree swivel coupling formed of a general purpose and heat-stabilized injection molding grade 6/6 type plastic resin includes a socket member and a stem member in telescoped relation. The socket member includes an outer skirt connected by spaced flexing arms to a connecting body portion. The skirt and opposed stem have a close complementing and mating bearing projection and recess establishing a swivel coupling. The bearing walls are inclined at an angle of 15 degrees. The skirt portion is slightly expandable outwardly. In the unstressed state, the bearing wall has a maximum diameter slightly less than that of the recess to establish a pressurized fit. The stem includes a cam having an inclined wall corresponding to the bearing projection with a maximum diameter slightly greater than the bearing wall of the skirt bearing and the same angle. The cam has a maximum smaller diameter than mating recesses in the flexing arms to allow the pressure bearing engagement. The inner end of the stem and socket include an inner cylindrical and mating sections. An O-ring seal within the cylindrical sections create a fluid pressure tight coupling.

26 Claims, 1 Drawing Sheet

SNAP SWIVEL COUPLING FOR FLUID FLOW APPLICATIONS

BACKGROUND OF THE PRESENT INVENTION

This invention relates to a snap swivel coupling for fluid flow applications and particularly to such a coupling of a relatively small size for pneumatic and other pressurized control and operating systems.

In various fluid control and operating systems, relatively small pneumatic lines are required for transmitting of control and operating fluid pressure and flow signals. The connection and running of the line through various channel and protected areas require the use of individual connectors for interconnecting of the lines. Intersecting paths require special shaped couplings and advantageously swivel couplings are used for convenience of assembly with a minimum number of different designed couplings.

U.S. Pat. No. 3,278,204 which issued on Oct. 11, 1966 discloses a swivel coupling for fluid flow systems. The coupling includes a first coupling stem which telescopes into a coupling receptacle or socket and includes a flange member which has a line engagement with the end of the socket member. The stem and socket in the assembled relation have axially spaced and oppositely extended projections or ledges on the opposed surfaces. A wedge locking member is forced upwardly between the members into the gap between the two ledges. The locking member is locked in place between the two ledges, thereby locking of the stem and socket to each other. The locking member is a cylindrical ring which holds the stem and socket in radially spaced relation and provides a turning bearing surface with respect to the stem and socket. The stem and socket members are therefore relatively free to rotate relative to each other and provide the desired swivel action. The coupling requires at least three parts and requires special assembly of the coupling.

Other swivel couplings are also disclosed in the prior art. The couplings are generally complex multiple part elements requiring special assembly, sealing elements and the like.

Notwithstanding the many different designs for swivel couplings in fluid flow systems, there remains a continuing need and demand for a highly reliable swivel coupling having a minimal number of parts and low cost production capability as well as ease of assembly.

SUMMARY OF THE PRESENT INVENTION

The present invention is particularly directed to a two piece swivel coupling with a snap action interconnection for ready and rapid assembly. Generally, in accordance with the teaching of the present invention, the coupling includes a stem member telescopically inserted into a socket member. The first member includes an annular bearing recess having an inclined bearing wall located between spaced ledges. The second member includes a radial projection substantially corresponding in cross section to the recess including the inclined bearing wall. In assembled relation, the projection closely mates with the annular recess and with the inclined bearing walls located in firm abutting bearing engagement. The one member has the annular bearing wall secured to the main body of the member through a plurality of circumferentially spaced arm members thereby establishing an essentially cantilevered support for the bearing wall. The inclined bearing wall of the opposite member defines a camming surface which cams onto the one end wall of the opposed member and permits a snap connection of the two components.

More particularly in a preferred and practical construction of the present invention, the stem member is formed with an inner radial ledge having a flat surface, with an inclined bearing surface extending outwardly and inwardly to an outwardly spaced similar ledge thereby defining an annular frusto conically shaped recess within the stem. The socket includes a body portion with an outwardly located skirt connected thereto by a plurality of flexure arms. The cantilevered skirt includes an inner peripheral projection complementing the recess on the stem. A cam recess is formed contiguous to the projection. In assembly, the stem is forced into the socket, with the skirt projection riding on the cam wall to flex the projection outwardly until the projection moves past the cam wall into alignment with the bearing recess. The skirt then snaps back toward its original unstressed state and moves into the recess with the bearing walls in tight but rotatable engagement. The skirt is held under slight tension to maintain firm sliding bearing engagement. The sliding surfaces are generally not fluid tight. To form a fluid tight coupling, the stem and sockets are formed with mating cylindrical inner portions, with a suitable seal unit located between the opposed surfaces.

The present invention thus provides a simple two piece snap swivel coupling if leakage is acceptable and a three piece coupling for fluid tight applications. The coupling is readily mass produced using present day technology and materials and thus produce a commercially cost efficient coupling for fluid control and operating systems.

DESCRIPTION OF THE DRAWING

The drawing furnished herewith generally illustrates the best mode presently contemplated for the invention and is described hereinafter.

In the drawing.

DESCRIPTION OF THE ILLUSTRATED EMBODIMENT

Figure 1:
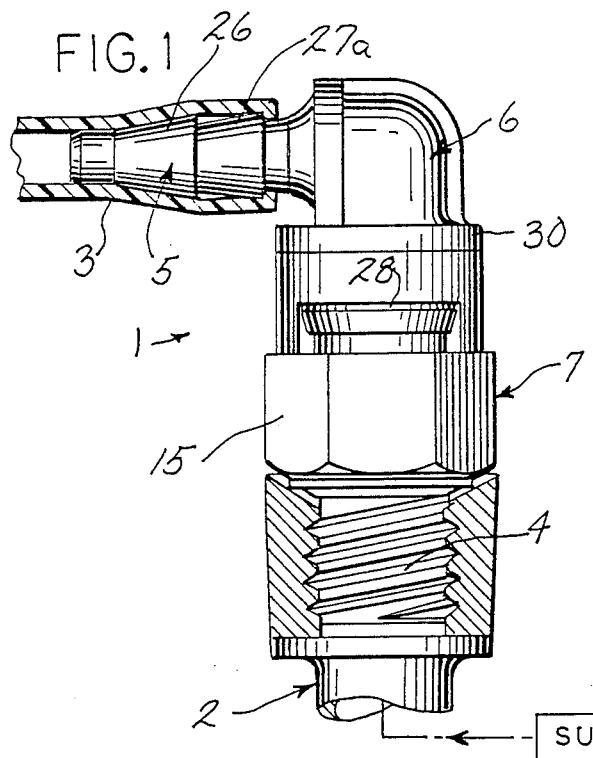
FIG. 1 is a side elevational view of swivel coupling constructed in accordance with the teaching of the present invention and connected in a pneumatic system.
Figure 3:
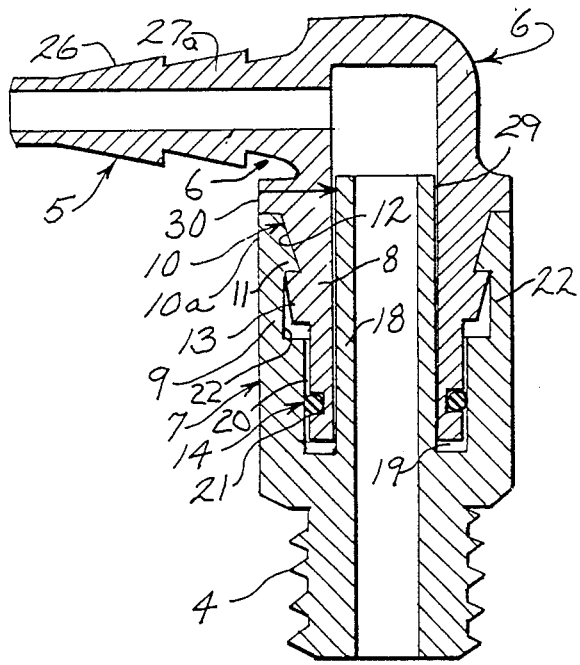
FIG. 3 is an enlarged vertical longitudinal section of the coupling shown in FIG. 1.
Figure 2:
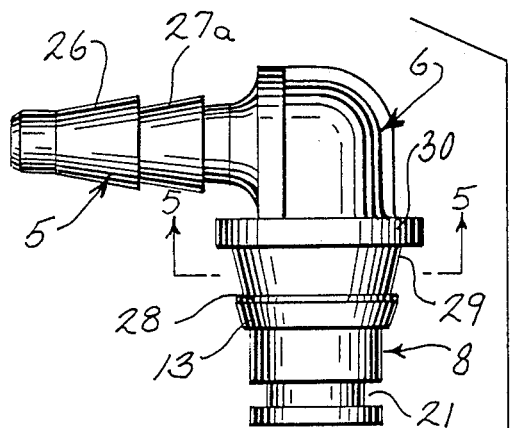
FIG. 2 is an exploded view of the coupling shown in FIG. 1.
Figure 4:
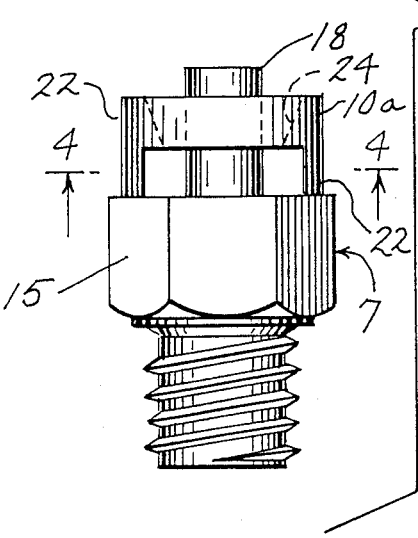
FIG. 4 is a horizontal section taken generally on line 4—4 of FIG. 2.
Figure 4:
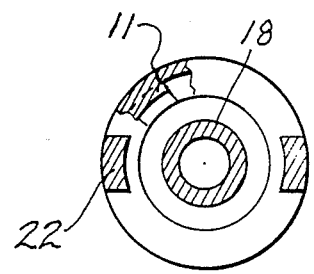
Figure 5:
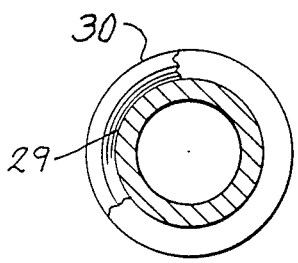
FIG. 5 is a horizontal section taken generally on line 5—5 of FIG. 2.

Referring to the drawing and particularly to FIG. 1, a swivel coupling 1 connects a first or source flow line 2 sonnected to a pnumatic supply to a second or output flow line 3. The lines 2 and 3 are oriented at 90 degrees to each other and the coupling 1 is formed as a 90 degree elbow. Line 2 is shown having a threaded end nut secured to a threaded end connector 4 of the coupling 1. The line 3 is a flexible, resilient plastic or the like and is secured to a barbed connector 5 on the opposite end of the coupling 1.

The coupling 1 is formed as a 2 piece unit having an L-shaped coupling member 6 including the barbed connector 5 and having a straight coupling member 7 having the threaded connector 5. The L-shaped coupling member 6 includes a stem 8 which telescopes into a socket 9 in member 7. The stem 8 and socket 9 are connected in a close-fitted engagement with a tapered bearing unit 10 specially constructed within the fitted stem and socket. The socket 9 is formed with an outer skirt 10a including an annular bearing projection 11 mating with a complementing recess or cavity 12 on stem 8 to form bearing unit 10. The projection and recess 12 have complementing tapered or conical surfaces defining corresponding bearing surfaces. Inwardly of the recess 12, an inclined projecting cam 13 is formed on stem 8 having an angle generally parallel to the base of the recess 12. The cam 13 rides on the inclined projection 11, deflecting the projection outwardly in the snap-action assembly.

The stem 8 further projects inwardly of socket 9 and includes an O-ring seal 14 compressed against the opposed wall of socket 9 to form a fluid tight connection, and thereby coupling.

In assembly, O-ring seal 14 is applied to the stem 8, and the stem 8 is forced into socket 9. The cam 13 on stem 8 engages projection 11 and deflects the outer skirt of socket 9 outwardly until the projection 11 is aligned with the cavity 12. The projection 11 then snaps into the cavity and into close fitting engagement to establish a tensioned engagement at the bearing interface. Thus, the projection 11 does not quite return to the unstressed state and establishes and maintains a smooth swivel rotational movement between the stems 8 and socket 9. The O-ring seal 14 creates the desired pressure tight closure of the coupling 1. The snap swivel coupling 1 basically includes two basic components, a stem member and a socket member, with camming members and the annular bearing projection and cavity coupling under radial stress for smooth swivel action and long life. For a pressure tight coupling, an additional seal element is provided in the illustrated embodiment.

Although any suitable material may be used in forming of the coupling, the material is preferably a tough, abrasive resistance molding plastic.

More particularly in the illustrated embodiment, the member 7 includes the socket 9 integrally molded with the threaded connector 4. The socket body immediately above the O-ring seal unit is a substantial body portion with the exterior formed with a hexagonal periphery 15 to receive a suitable wrench, not shown, for tightening of the threaded joint between the coupling and the flow line. A center tube 18 is molded into the member 7 and projects coaxially from the connector and body portion and particularly the socket base outwardly of the socket 8 to define an annular chamber 19 within the socket. In the assembled coupling, the tube 18 projects into stem 8, which correspondingly projects into annular chamber 19 with slight gaps 20 at the radial interface therebetween. Tube 18 is a support tube which contributes to the overall rigidity and strength of the coupling. This is particularly significant in the application to small swivel couplings. Thus, the coupling has been practically formed with a total overall length on the order of one-half inch and a maximum exterior diameter of less than one quarter inch. The inner end of the chamber 19 and the stem 8 are generally cylindrical with the O-ring seal 14 located within an annular recess 21 in the stem 8. The seal 14 projects from recess 21 between the exterior wall of the stem 8 and the opposed wall of the annular chamber 19 to seal the coupling.

The skirt 10a is connected to the annular chamber 19 by two arms 22, with openings between the arms. The openings and recesses 23 within the arms accommodate the cam 13 in the fully assembled state of the coupling.

Projection 11 is formed contiguous to the recess 23, with a common flat radial wall which joins to the inclined bearing wall 24 of bearing 10. The bearing wall 24 extends radially outwardly and longitudinally outwardly at the desired bearing angle. The angle bearing wall also provides an increased bearing area. Although the angle is not critical, in a small swivel coupling for connecting lines with internal passages of 1/16 to ⅛ inch diameter, a 15 degree bearing angle relative to a constant diameter cylinder having an axis coincident with the axis of the tubular stem and the corresponding socket member has been found to provide particularly satisfactory results. An outer flat radial wall 25 extends radially outwardly from the bearing wall 24 and forms the outer face of the socket.

The arms 22 connecting skirt 10a to the annular chamber body establish a firm, reliable support of skirt and bearing projections 10a while permitting the necessary slight movement of the bearing projection 11 into the cavity 12 of the stem 8.

The stem 8 is formed as the one leg of an L-shaped elbow member, with the other leg formed as a tubular extension including the double barbs 5. The double barbed end of the coupling member 6 is a molded member with the first or outermost barb 26 specially formed without a parting line to establish and insure a coupling to the flexible plastic line 3 which is fluid tight and therefore without leakage. The additional barb 27 or barbs, insure a more positive hold and connection at higher pressure.

The stem 8 of member 6 is a tubular member with the inner end formed as a substantial cylinder located within the inner end of the socket chamber 19. The seal recess 21 is provided within the cylinder and has a depth slightly less than the diameter of the O-ring seal 14. The projection of seal 14 spans the gap 20 to the socket wall and seals the interface with a sliding fit in accordance with known technology.

The cam 13 on stem 8 is located in alignment with recess 22 in the assembled state. The outer end of the inclined cam 13 is undercut, with a cylindrical surface 28 of a diameter slightly less than the base of the recess 22. The surface 28 is therefore spaced from the base of recess 22. This allows the skirt to deflect fully and unrestricatedly with bearing wall 24 of projection 11 into pressure engagement with the base wall of the bearing recess 12 on stem 8.

The bearing recess 12 includes a flat radial wall extending from the undercut surface to an inclined bearing wall 29 forming the second bearing surface of bearing unit 10 and formed with the same angle as the bearing wall 24 of the projection. The inclined bearing walls 24 and 29 are essentially coextensive. An annular flange 30, integral with the molded stem 8, projects outwardly with a bottom radial wall defining the upper wall of recess 12 such that projection 11 closely complements the bearing recess 12 in the stem 8. The cantilevered socket skirt flexes to establish a pressure engagement between the bearing surfaces.

The coupling members 6 and 7 are formed of a suitable plastic material to establish a low friction sliding force while creating a stable coupling position. Although the coupling may be formed of any suitable material which permits the snap coupling, a general purpose plastic such as Celanese Nylon 1000-2, manufactured and sold by Celanse Corporation of 1211 Avenue of the Americas, New York, N.Y., 10036, has been found to provide a particularly satisfactory product. The material is a general purpose and heat-stabilized injection molding grade 6/6 type plastic resin. The material has a high strength and toughness as well as being resistant to abrasion and chemical attack.

The illustrated three piece swivel coupling provides a 360 degree rotation of the main flowing connecting members; the stem 8 and socket 9. The stem and socket may be formed of a basic design with the threaded end formed with an industry standard such as a 10-32 UNF thread.

The threaded plastic member is readily designed to fit a complementing thread in various materials including plastic, steel, brass, aluminum and other available materials. The barbed end of the swivel coupling has been formed as a right angle unit as shown and a T-shaped unit, with dual barbs on the opposite ends of the cross-stem, in three basic sizes to fit 1/16, 3/32 and ⅛ inch flexible internal diameter tubing. Other configurations and sizes can of course be formed in the small sizes, a ¼ inch hex head is conveniently provided for the 1/16 inch coupling and a 5/16 inch for the others.

Various modes for carrying out the invention are contemplated as being within the scope of the following claims particularly pointing out and distinctly clamping the subject matter which is regarded as the invention.

I claim:

1. A swivel coupling, comprising a tubular socket member having a line connecting end and a coupling end, a tubular stem member having a line connecting end and coupling end telescoped into said coupling end of said socket, said coupling ends including integral complementing annular projection and recess portions having uninterrupted and continuous peripheral annular bearing surfaces, said annular projection portion having a diameter greater than the diameter of said recess and thereby defining a close fitting bearing unit with the peripheral annular bearing surfaces in internal stress and creating forced engagement therebetween to establish a smooth rotational support of said socket member and said stem member.

2. The swivel coupling of claim 1 wherein said bearing surfaces are at an angle of substantially fifteen degrees from a constant diameter cylinder plane having an axis coincident with the axis of said tubular stem member.

3. The swivel coupling of claim 1 wherein said members are formed of a high strength and tough plastic which is highly resistant to abrasion and chemical attack.

4. The swivel coupling of claim 3 wherein said plastic is a nylon.

5. The swivel coupling of claim 3 wherein said plastic is a heat stabilized injection molding grade 6/6 type plastic resin.

6. The swivel coupling of claim 1 wherein said socket member includes a cantilevered continuous annular skirt including the complementing portion of said projection and recess portions and said socket member having circumferentially spaced openings adjacent said projection and recess portions to permit deflection thereof during assembly of said skirt with said tubular stem member.

7. The swivel coupling of claim 6 wherein said bearing surfaces are inclined at a shallow angle from a constant diameter cylinder plane having an axis coincident with the axis of said tubular stem ember and the member including said recess portion including a cam surface parallel to said bearing surface and adjacent the longitudinal end of the recess and engaging said projection portion during the telescopic assembly to deflect said projection portion.

8. The swivel coupling of claim 7 wherein said shallow angle is substantially fifteen degrees.

9. The swivel coupling of claim 1 including a separate seal unit located between said stem member and said socket member, said socket member including an inner support tube member extended into said stem, and said seal unit located inwardly of said bearing unit between the outer side of said stem and the adjacent socket member.

10. The swivel coupling of claim 1 including a cylindrical mating chamber in said socket member and a projecting wall in said stem member, said chamber having a tubular wall projecting upwardly through said stem located in close spaced relation to said stem.

11. The swivel coupling of claim 1 wherein at least one of said members is formed of a plastic which is highly resistant to abrasion and chemical attack and permitting said telescoped coupling.

12. The swivel coupling of claim 11 wherein said plastic is a heat stabilized injection molding grade 6/6 type plastic resin.

13. The swivel coupling of claim 11 wherein said one of said member is said tubular stem member.

14. A two-piece snap swivel coupling, comprising a stem member having an internal bearing recess with an inclined bearing wall inclined relative to a constant diameter cylinder plane having an axis coincident with the axis of said tubular stem member and planar parallel bearing end walls at the opposite ends of said inclined wall, a socket member telescoped with said stem member and having an outer annular skirt portion including a continuous and uninterrupted bearing projection complementing and mating with said bearing recess to establish a swivel coupling, said socket member having openings immediately adjacent said bearing projection and defining a plurality of spaced supports for said socket member and planar radial faces abutting the planar parallel bearing end walls of the recess in said stem member.

15. The snap swivel coupling of claim 14 wherein said skirt portion is expandable outwardly and having an stressed state with said bearing wall of a diameter slightly less than said bearing wall of said recess whereby said bearing walls are forcibly engaged.

16. The snap swivel coupling of claim 14 wherein said stem includes a cam projection extending longitudinal from said bearing recess, said cam projection having an inclined wall with a maximum diameter slightly greater than said bearing wall of said projection of said socket.

17. The swivel coupling of claim 16 wherein said cam projection has a maximum diameter less than the aligned diameter of said socket member.

18. The swivel coupling of claim 14 wherein said socket member includes an inner cylindrical chamber, said stem member includes an inner cylindrical end located in close spaced relation within said chamber of said socket member, and a pressure seal unit located between said cylindrical sections.

19. The swivel coupling of claim 18 wherein said socket member includes an inner tubular member projecting axially from said chamber through said socket member.

20. The swivel coupling of claim 19 wherein said inner tubular member projects outwardly of said skirt of said socket member.

21. A molded plastic swivel coupling, comprising a socket member having an outer continuous annular skirt connected to an inner body portion by a plurality of circumferentially spaced arms, said skirt having an internal bearing projection, a stem member projecting into said socket member and having an outer bearing recess closely complementing and mating said bearing projection to establish a swivel coupling, said skirt portion being expandable outwardly, and a cam member on said stem located immediately inwardly of said recess and engaging said projection to deflect said skirt for assembly of the coupling.

22. The swivel coupling of claim 21 wherein said projection includes an inclined bearing wall inclined relative to a constant diameter cylinder plane having an axis coincident with the axis of said tubular stem member and flat parallel bearing end walls at the opposite ends of said inclined wall.

23. The swivel coupling of claim 21 wherein said skirt portion includes an unstressed state with said bearing wall of a diameter slightly less than said bearing wall of said recess whereby said bearing walls are forcibly engaged in the assembled state.

24. The swivel coupling of claim 21 wherein said cam member on said stem extends longitudinal of said bearing recess, said cam member having an inclined wall inclined relative to a constant diameter cylinder having an axis coincident with the axis of said tubular stem member for camming engagement with said bearing wall of said skirt.

25. The swivel coupling of claim 24 wherein said socket member and stem members include telescoped cylindrical sections, and a pressure seal unit located between said cylindrical sections.

26. The swivel coupling of claim 21 wherein said cam member has a maximum diameter less than the aligned diameter defined by said arms.

* * * * *